(12) United States Patent
Anschuetz (10) Patent No.: US 10,000,267 B1
(45) Date of Patent: Jun. 19, 2018

(54) METHODS FOR TRIMMING TRIMMABLE MARINE DEVICES WITH RESPECT TO A MARINE VESSEL

(71) Applicant: Brunswick Corporation, Lake Forest, IL (US)

(72) Inventor: Steven M. Anschuetz, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days. days.

(21) Appl. No.: 15/676,185

(22) Filed: Aug. 14, 2017

(51) Int. Cl.
*B63H 20/08* (2006.01)
*B63H 20/10* (2006.01)
*G05D 3/00* (2006.01)

(52) U.S. Cl.
CPC .............. *B63H 20/10* (2013.01); *G05D 3/00* (2013.01)

(58) Field of Classification Search
CPC .................................. B63H 20/10; G05D 3/00
See application file for complete search history.

(56) References Cited

U.S. PATENT DOCUMENTS

| | | |
|---|---|---|
| 3,682,127 A | 8/1972 | Waquet |
| 3,777,694 A | 12/1973 | Best |
| 3,999,502 A | 12/1976 | Mayer |
| 4,050,359 A | 9/1977 | Mayer |
| 4,318,699 A | 3/1982 | Wenstadt et al. |
| 4,413,215 A | 11/1983 | Cavil et al. |
| 4,490,120 A | 12/1984 | Hundertmark |
| 4,565,528 A | 1/1986 | Nakase |
| 4,718,872 A | 1/1988 | Olson et al. |
| 4,749,926 A | 6/1988 | Ontolchik |
| 4,776,818 A | 10/1988 | Cahoon et al. |
| 4,824,407 A | 4/1989 | Torigai et al. |

(Continued)

FOREIGN PATENT DOCUMENTS

EP    2368791 B1    1/2013

OTHER PUBLICATIONS

Andrasko et al., "Systems and Methods for Automatically Controlling Attitude of a Marine Vessel with Trim Devices," Unpublished U.S. Appl. No. 14/873,803, filed Oct. 2, 2015.

(Continued)

*Primary Examiner* — Stephen P Avila
(74) *Attorney, Agent, or Firm* — Andrus Intellectual Property Law, LLP (57) ABSTRACT

A method for a trimmable marine device includes determining a target trim position of the marine device. A trim actuator is activated for an activation time that is calibrated to move the marine device from a current trim position to the target trim position. After activating the trim actuator for the calibrated activation time, a difference between an actual trim actuator condition and a desired trim actuator condition is calculated. An activation-time adapt value is determined based on the difference. The calibrated activation time is adjusted using the adapt value, and the trim actuator is activated for the adjusted activation time in response to subsequent changes in the target trim position. The adapt value is configured such that activating the trim actuator for the adjusted activation time moves the marine device closer to the target trim position than does activating the trim actuator for the calibrated activation time.

20 Claims, 5 Drawing Sheets

(56) References Cited

U.S. PATENT DOCUMENTS

| | | |
|---|---|---|
| 4,836,810 A | 6/1989 | Entringer |
| 4,861,292 A | 8/1989 | Griffiths et al. |
| 4,872,857 A | 10/1989 | Newman et al. |
| 4,898,563 A | 2/1990 | Torigai et al. |
| 4,908,766 A | 3/1990 | Takeuchi |
| 4,931,025 A | 6/1990 | Torigai et al. |
| 4,939,660 A | 7/1990 | Newman et al. |
| 4,940,434 A | 7/1990 | Kiesling |
| 4,957,457 A | 9/1990 | Probst et al. |
| 5,113,780 A | 5/1992 | Bennett et al. |
| 5,118,315 A | 6/1992 | Funami et al. |
| 5,142,473 A | 8/1992 | Davis |
| 5,169,348 A | 10/1992 | Ogiwara et al. |
| 5,171,172 A | 12/1992 | Heaton et al. |
| 5,263,432 A | 11/1993 | Davis |
| 5,352,137 A | 10/1994 | Iwai et al. |
| 5,366,393 A | 11/1994 | Uenage et al. |
| 5,385,110 A | 1/1995 | Bennett et al. |
| 5,474,012 A | 12/1995 | Yamada et al. |
| 5,474,013 A | 12/1995 | Wittmaier |
| 5,507,672 A | 4/1996 | Imaeda |
| 5,540,174 A | 7/1996 | Kishi et al. |
| 5,647,780 A | 7/1997 | Hosoi |
| 5,683,275 A | 11/1997 | Nanami |
| 5,707,263 A | 1/1998 | Eick et al. |
| 5,785,562 A | 7/1998 | Nestvall |
| 5,832,860 A | 11/1998 | Lexau |
| 5,879,209 A | 3/1999 | Jones |
| 6,007,391 A | 12/1999 | Eilert |
| 6,015,318 A | 1/2000 | Uematsu et al. |
| 6,042,434 A | 3/2000 | Nakamura |
| 6,048,234 A | 4/2000 | Uematsu et al. |
| 6,095,077 A | 8/2000 | DeAgro |
| 6,167,830 B1 | 1/2001 | Pilger |
| 6,273,771 B1 | 8/2001 | Buckley et al. |
| 6,298,824 B1 | 10/2001 | Suhre |
| 6,322,404 B1 | 11/2001 | Magee et al. |
| 6,354,237 B1 | 3/2002 | Gaynor et al. |
| 6,363,875 B1 | 4/2002 | Griffith et al. |
| 6,458,003 B1 | 10/2002 | Krueger |
| 6,583,728 B1 | 6/2003 | Staerzl |
| 6,733,350 B2 | 5/2004 | Iida et al. |
| 6,745,715 B1 | 6/2004 | Shen et al. |
| 6,994,046 B2 | 2/2006 | Kaji et al. |
| 6,997,763 B2 | 2/2006 | Kaji |
| 7,143,363 B1 | 11/2006 | Gaynor et al. |
| 7,156,709 B1 | 1/2007 | Staerzl et al. |
| 7,188,581 B1 | 3/2007 | Davis et al. |
| 7,311,058 B1 | 12/2007 | Brooks et al. |
| 7,347,753 B1 | 3/2008 | Caldwell et al. |
| 7,389,165 B2 | 6/2008 | Kaji |
| 7,416,456 B1 | 8/2008 | Gonring et al. |
| 7,462,082 B2 | 12/2008 | Kishibata et al. |
| 7,506,599 B2 | 3/2009 | Mizutani |
| 7,530,865 B2 | 5/2009 | Kado et al. |
| 7,543,544 B2 | 6/2009 | Yap |
| 7,617,026 B2 | 11/2009 | Gee et al. |
| 7,641,525 B2 | 1/2010 | Morvillo |
| 7,942,711 B1 | 5/2011 | Swan |
| 7,958,837 B1 | 6/2011 | Fraleigh |
| 7,972,243 B2 | 7/2011 | Kado et al. |
| 8,011,982 B1 | 9/2011 | Baier et al. |
| 8,113,892 B1 | 2/2012 | Gable et al. |
| 8,145,370 B2 | 3/2012 | Borrett |
| 8,216,007 B2 * | 7/2012 | Moore .................... B63B 39/03 114/285 |
| 8,261,682 B1 | 9/2012 | DeVito |
| 8,376,791 B2 | 2/2013 | Chiecchi |
| 8,376,793 B2 | 2/2013 | Chiecchi |
| 8,388,390 B2 | 3/2013 | Kuriyagawa et al. |
| 8,428,799 B2 | 4/2013 | Cansiani et al. |
| 8,444,446 B2 | 5/2013 | Kuriyagawa et al. |
| 8,457,820 B1 | 6/2013 | Gonring |
| 8,480,445 B2 | 7/2013 | Morvillo |
| 8,583,300 B2 | 11/2013 | Oehlgrien et al. |
| 8,622,777 B1 | 1/2014 | McNalley et al. |
| 8,631,753 B2 | 1/2014 | Morvillo |
| 8,740,658 B2 | 6/2014 | Kuriyagawa |
| 8,764,500 B2 | 7/2014 | Kuriyagawa et al. |
| 8,807,059 B1 | 8/2014 | Samples et al. |
| 8,855,890 B2 | 10/2014 | Egle et al. |
| 8,858,278 B2 | 10/2014 | Morvillo |
| 9,052,717 B1 | 6/2015 | Walser et al. |
| 9,068,855 B1 | 6/2015 | Guglielmo |
| 9,278,740 B1 | 3/2016 | Andrasko et al. |
| 9,290,252 B1 | 3/2016 | Tuchscherer et al. |
| 9,359,057 B1 | 6/2016 | Andrasko et al. |
| 9,381,989 B1 | 7/2016 | Poirier |
| 9,463,858 B1 | 10/2016 | Remmers et al. |
| 9,643,698 B1 | 5/2017 | Andrasko et al. |
| 9,694,892 B1 * | 7/2017 | Anschuetz ............. B63H 20/10 |
| 9,745,036 B2 * | 8/2017 | Andrasko ............. B63H 20/10 |
| 9,751,605 B1 * | 9/2017 | Anschuetz ............. B63H 20/10 |
| 9,862,471 B1 * | 1/2018 | Taylor .................... B63H 20/10 |
| 9,896,174 B1 * | 2/2018 | Anschuetz ............. B63H 20/10 |
| 2003/0013359 A1 | 1/2003 | Suganuma et al. |
| 2005/0245147 A1 | 11/2005 | Takada et al. |
| 2007/0089660 A1 | 4/2007 | Bradley |
| 2011/0263167 A1 | 10/2011 | Chiecchi |
| 2012/0272538 A1 | 11/2012 | Moore |
| 2013/0312651 A1 | 11/2013 | Gai |
| 2013/0340667 A1 | 12/2013 | Morvillo |
| 2014/0209007 A1 | 7/2014 | Morvillo |
| 2014/0224166 A1 | 8/2014 | Morvillo |
| 2014/0295717 A1 | 10/2014 | Kuriyagawa et al. |
| 2016/0068247 A1 * | 3/2016 | Morvillo ................ B63H 20/08 701/21 |

OTHER PUBLICATIONS

Anschuetz et al., "System and Method for Trimming a Trimmable Marine Device With Respect to a Marine Vessel", Unpublished U.S. Appl. No. 15/003,326, filed Jan. 21, 2016.

Mercury Marine, 90-8M0076286 JPO Service Manual—Auto Trim Portion, Theory of Operation, Jul. 2013, p. 2A-5.

Mercury Marine, 90-8M0081623 JPO Owners Manual—Auto Trim Portion, Section 2—On the Water, May 2013, p. 21.

* cited by examiner

METHODS FOR TRIMMING TRIMMABLE MARINE DEVICES WITH RESPECT TO A MARINE VESSEL

FIELD

The present disclosure relates to methods for controlling a trim position of a trimmable marine device coupled to a transom of a marine vessel.

BACKGROUND

U.S. Pat. No. 4,318,699 discloses a sensor that responds to the operation of a marine transportation system to sense on-plane and off-plane conditions of a boat to operate a trim control to automatically position a trimmable drive for a desired boating operation. The preferred embodiment senses engine speed while an alternative embodiment senses fluid pressure opposing boat movement. The drive is moved to an auto-out position at high speeds and to a trimmed-in position at lower speeds.

U.S. Pat. No. 4,490,120 discloses a hydraulic system for trimming and tilting an outboard propulsion unit, which includes both trim piston-cylinder units and a trim-tilt piston-cylinder unit. The flow of hydraulic fluid from the reversible pump is controlled by a spool valve. A pressure relief valve is mounted in the spool to maintain pressure on one side of the spool when the pump is turned off to rapidly close the return valve and prevent further movement of the piston-cylinder units.

U.S. Pat. No. 4,861,292 discloses a system for optimizing the speed of a boat at a particular throttle setting that utilizes sensed speed changes to vary the boat drive unit position vertically and to vary the drive unit trim position. The measurement of boat speed before and after an incremental change in vertical position or trim is used in conjunction with a selected minimum speed change increment to effect subsequent alternate control strategies. Depending on the relative difference in before and after speeds, the system will automatically continue incremental movement of the drive unit in the same direction, hold the drive unit in its present position, or move the drive unit an incremental amount in the opposite direction to its previous position. The alternate control strategies minimize the effects of initial incremental movement in the wrong direction, eliminate excessive position hunting by the system, and minimize drive unit repositioning which has little or no practical effect on speed.

U.S. Pat. No. 6,007,391 discloses an automatically adjustable trim system for a marine propulsion system that provides automatic trimming of the propeller in response to increased loads on the propeller. A propulsion unit is attached to a boat transom through a tilt mechanism including a transom bracket and a swivel bracket. In a first embodiment, the transom bracket is clamped to a flexible transom which flexes in response to forces exerted on the transom during acceleration. In a second embodiment, the transom bracket is clamped to a transom bracket mounting platform that is generally parallel to and pivotally attached to the transom. A trim angle biasing mechanism is mounted between the transom and the transom bracket mounting platform for automatically adjusting the trim angle. A third embodiment includes a trim angle biasing mechanism incorporated into the transom bracket or swivel bracket. A fourth embodiment includes a spring-loaded pawl assembly between the swivel bracket and transom bracket.

U.S. Pat. No. 7,347,753 discloses a hydraulic system for a sterndrive marine propulsion device that directs the flow of hydraulic fluid through the body and peripheral components of a gimbal ring in order to reduce the number and length of flexible hydraulic conduits necessary to conduct pressurized hydraulic fluid from a pump to one or more hydraulic cylinders used to control the trim or tilt of a marine drive unit relative to a gimbal housing.

U.S. Pat. No. 7,416,456 discloses an automatic trim control system that changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 8,457,820 discloses a method for controlling the operation of a marine vessel subject to porpoising. The method includes sensing an operational characteristic of the marine vessel which is indicative of porpoising of the marine vessel, and responding to the sensing of the operational characteristic with a response that is representative of the operational characteristic of the marine vessel as being indicative of the porpoising of the marine vessel.

Unpublished U.S. patent application Ser. No. 14/873,803, filed Oct. 2, 2015, which is assigned to the Applicant of the present application, discloses systems and methods for controlling position of a trimmable drive unit with respect to a marine vessel. A controller determines a target trim position as a function of vessel or engine speed. An actual trim position is measured and compared to the target trim position. The controller sends a control signal to a trim actuator to trim the drive unit toward the target trim position if the actual trim position is not equal to the target trim position and if at least one of the following is true: a defined dwell time has elapsed since a previous control signal was sent to the trim actuator to trim the drive unit; a given number of previous control signals has not been exceeded in an attempt to achieve the target trim position; and a difference between the target trim position and the actual trim position is outside of a given deadband. The method may include sending a second control signal for a defined brake time to trim the drive unit in an opposite, second direction in response to a determination that the actual trim position has one of achieved and exceeded the target trim position.

Unpublished U.S. patent application Ser. No. 15/003,326, filed Jan. 21, 2016, which is assigned to the Applicant of the present application, discloses a method for controlling a trim system on a marine vessel includes receiving an actual trim position of a trimmable marine device at a controller and determining a trim position error by comparing the actual trim position to a target trim position with the controller. The method also includes determining an acceleration rate of the marine vessel. In response to determining that the trim position error exceeds a first error threshold and the magnitude of the acceleration rate exceeds a given rate threshold, the controller commands the marine device to the target trim position. In response to determining that the trim position error exceeds the first error threshold and the acceleration rate does not exceed the given rate threshold, the controller commands the marine device to a setpoint trim position that is different from the target trim position. An associated system is also disclosed.

U.S. Pat. No. 9,694,892 discloses a method for controlling a trim system on a marine vessel includes receiving an actual trim position of a trimmable marine device at a controller and determining a magnitude of a trim position error by comparing the actual trim position to a target trim position with the controller. The method also includes determining a magnitude of an acceleration rate of the marine vessel. The controller determines the activation time of a trim actuator coupled to and rotating the marine device with respect to the marine vessel based on the magnitude of the trim position error and the magnitude of the acceleration rate. The controller then sends a control signal to activate the trim actuator to rotate the marine device toward the target trim position. The method includes discontinuing the control signal once the activation time expires to deactivate the trim actuator. A corresponding system is also disclosed.

The above U.S. patents and applications are hereby incorporated by reference herein in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a method is disclosed for controlling a trim position of a trimmable marine device coupled to a transom of a marine vessel, which method is carried out by a control module. The method includes determining a target trim position of the marine device with respect to the transom. The method includes activating a trim actuator coupled to and rotating the marine device about a horizontal trim axis for an activation time that is calibrated to move the marine device from a current trim position to the target trim position. After activating the trim actuator for the calibrated activation time, the method includes calculating a difference between an actual trim actuator condition and a desired trim actuator condition. The control module determines an activation-time adapt value based on the difference. The control module adjusts the calibrated activation time using the adapt value and activates the trim actuator for the adjusted activation time in response to subsequent changes in the target trim position. The adapt value is configured such that activating the trim actuator for the adjusted activation time moves the marine device closer to the target trim position than does activating the trim actuator for the calibrated activation time.

According to another example of the present disclosure, a method for controlling a trim position of a trimmable marine device coupled to a transom of a marine vessel, which method is carried out by a control module, includes determining a target trim position of the marine device with respect to the transom. The method next includes activating a trim actuator coupled to and rotating the marine device about a horizontal trim axis for an activation time that is calibrated to move the marine device from a current trim position to the target trim position. The method includes calculating an actual trim rate of change as the marine device moves from the current trim position to the target trim position, and calculating a rate difference between the actual trim rate of change and a calibrated trim rate of change. After activating the trim actuator for the calibrated activation time, the method includes calculating a position difference between an actual, measured trim position of the marine device and the target trim position. The method then includes determining an activation-time adapt value based on at least one of the rate difference and the position difference, wherein the adapt value is configured to reduce the position difference. The control module adjusts the calibrated activation time using the adapt value and activates the trim actuator for the adjusted activation time in response to subsequent changes in the target trim position.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

The present disclosure relates to systems and methods for controlling one or more trim actuators on a marine vessel so as to control a relative position of a trimmable marine device with respect to the marine vessel. In one example, the trim actuator is a hydraulic piston-cylinder assembly in fluid communication with a hydraulic pump-motor combination, although the principles of some of the below examples could apply equally to electric linear actuators, pneumatic actuators, or other types of trim devices. The trim actuator may be actuated between an extended position and a retracted position by provision of hydraulic fluid, electrical power, pneumatic fluid, etc. The extension and retraction of the trim actuator can be used to rotate a trimmable marine device up and down with respect to a marine vessel to which it is coupled. Examples of such a trimmable marine device include, but are not limited to: trim tabs, trim deflectors, trim interceptors, and/or marine propulsion devices such as outboard motors or lower units of stern drives.

Those skilled in the art of marine vessel propulsion and control are familiar with many different ways in which the trim position of a marine device such as an outboard motor or stern drive can be varied to change the handling or fuel efficiency of the vessel. For example, many manual trim control systems are known to those skilled in the art. In typical operation, the operator of a marine vessel can change the trim angle of an associated outboard motor as the velocity of the vessel changes. This is done to maintain an appropriate angle of the vessel with respect to the water as it achieves a planing speed and as it increases its velocity over the water while on plane. The operator inputs a command to change the trim angle for example by using a keypad, button, or similar input device with "trim up" and "trim down" input choices.

The systems of the present disclosure are also capable of carrying out automatic trim (auto-trim) methods, in which the marine device is automatically trimmed up or down with respect to its current position, depending on a desired attitude of the marine vessel with respect to vessel speed and/or engine speed. Auto-trim systems perform trim operations automatically, as a function of vessel speed and/or engine speed, without requiring intervention by the operator of the marine vessel. The automatic change in trim angle of the trimmable marine device enhances the operation of the marine vessel as it achieves planing speed and as it further increases its velocity over the water while on plane. For example, trimming the marine device can affect a direction of thrust of a propeller with respect to a vessel transom, as well as affect vessel roll and pitch.

Figure 1:
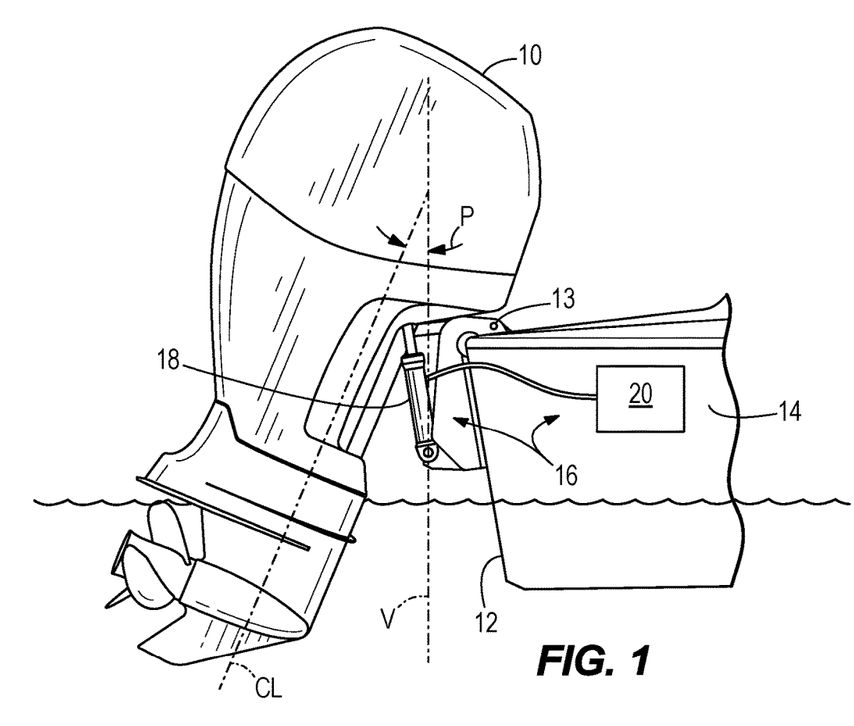
FIG. 1 illustrates one example of a trimmable marine device.

Referring to FIG. 1, the position of a trimmable marine device 10 (such as the outboard motor shown herein) with respect to the transom 12 of a marine vessel 14 is controlled by a trim actuator 16. The trim actuator 16 may comprise a hydraulic piston-cylinder assembly 18 connected to a hydraulic pump-motor combination 20. The piston-cylinder assembly 18 has a first end (here, the cylinder end) coupled to the transom 12 of the marine vessel 14 and a second, opposite end (here, the rod end) coupled to the marine device 10, as known to those having ordinary skill in the art. The piston-cylinder assembly 18 operates to rotate the marine device 10 about a horizontal trim axis 13 to a trimmed-out position, to a trimmed-in position, or to maintain the marine device 10 in any position there between as the pump-motor combination 20 provides hydraulic fluid to the piston-cylinder assembly 18 to move the piston within the cylinder. As mentioned, however, other types of hydro-mechanical or electro-mechanical actuators could be used in other examples.

Figure 2:
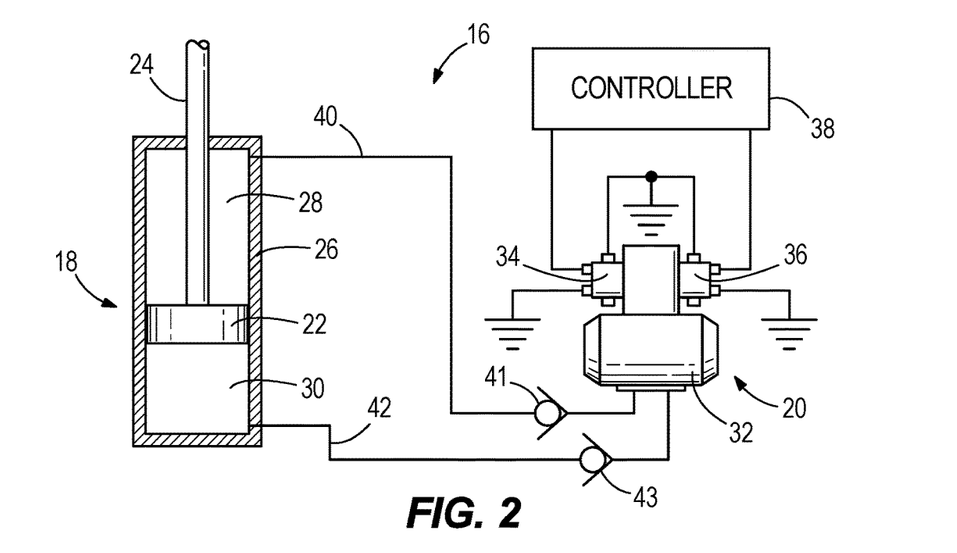
FIG. 2 illustrates a schematic of a trim actuator.

One example of a hydraulic trim actuator 16 is shown in FIG. 2. The piston-cylinder assembly 18 is shown schematically as having a piston 22 connected to a rod 24 disposed in a cylinder 26. The piston 22 defines a first chamber 28 within the cylinder 26 and a second chamber 30 within the cylinder 26, both of which chambers 28, 30 change in size as the piston 22 moves within the cylinder 26. The pump-motor combination 20 includes a pump-motor 32 connected to a trim-in relay 34 and a trim-out relay 36. In other examples, the trim-in relay 34 and the trim-out relay 36 are a single relay that can turn the pump-motor 32 on or off and can effect a trim-in or trim-out movement of the trim actuator 16. The relays 34 and 36 are connected to a control module 38 that controls energizing of solenoids in the relays 34 and 36, which act as switches to couple a power source such as a battery (not shown) to the pump-motor 32. A first hydraulic line 40 couples the pump-motor 32 to a first chamber 28 of the piston-cylinder assembly 18, and a second hydraulic line 42 couples the pump-motor 32 to the second chamber 30 of the piston-cylinder assembly 18. As long as the trim-in relay 34 is activated, the pump-motor 32 provides hydraulic fluid through the first hydraulic line 40 to the first chamber 28 of the piston-cylinder assembly 18, thereby pushing the piston 22 downwardly within the cylinder 26 and lowering (trimming in) the marine device 10 coupled to the rod 24. As long as the trim-out relay 36 is activated, the pump-motor 32 provides hydraulic fluid through the second hydraulic line 42 to the second chamber 30 of the piston-cylinder assembly 18, thereby pushing the piston 22 upwardly within the cylinder 26 and raising (trimming out) the marine device 10 coupled to the rod 24. Hydraulic fluid can be removed from the opposite chamber 28 or 30 of the cylinder 26 into which fluid is not being pumped in either instance, and drained to a tank or circulated through the pump-motor 32.

In this way, the trim actuator 16 can position the marine device 10 at different angles with respect to the transom 12. These may be a neutral (level) trim position, in which the marine device 10 is in more or less of a vertical position; a trimmed in (trimmed down) position; or a trimmed out (trimmed up) position. A trimmed out position, as shown in FIG. 1, is often used when the marine vessel is on plane and high speeds are required. At high speeds, the trimmed out position causes the bow of the marine vessel 14 to rise out of the water, resulting in better handling and increased fuel efficiency. Thus, many auto-trim algorithms include determining a target trim position at which to orient the marine device 10 with the control module 38 based on vessel speed. In other examples, the target trim position may be based on other vessel conditions, such as but not limited to engine speed, a combination of vessel speed and engine speed, or a tradeoff between vessel speed and engine speed depending on additional vessel conditions. The control module 38 may define the target trim position by reference to a vertical line V. When the centerline CL of the marine device 10 is parallel to the vertical line V, the control module 38 may consider this to be zero trim. Non-zero trim can be quantified as a value P, which represents the angle between the centerline CL of the marine device 10 and the vertical line V. This value P can be expressed as an angle, a percentage of a total angle to which the marine device 10 can be trimmed, a scalar value, a polar coordinate, or any other appropriate unit. For purposes of the description provided herein below, the angle P will be expressed as a percentage of total allowable trim angle, which can be measured from vertical, from a fully trimmed-out position, or from a fully-trimmed in position.

Figure 3:
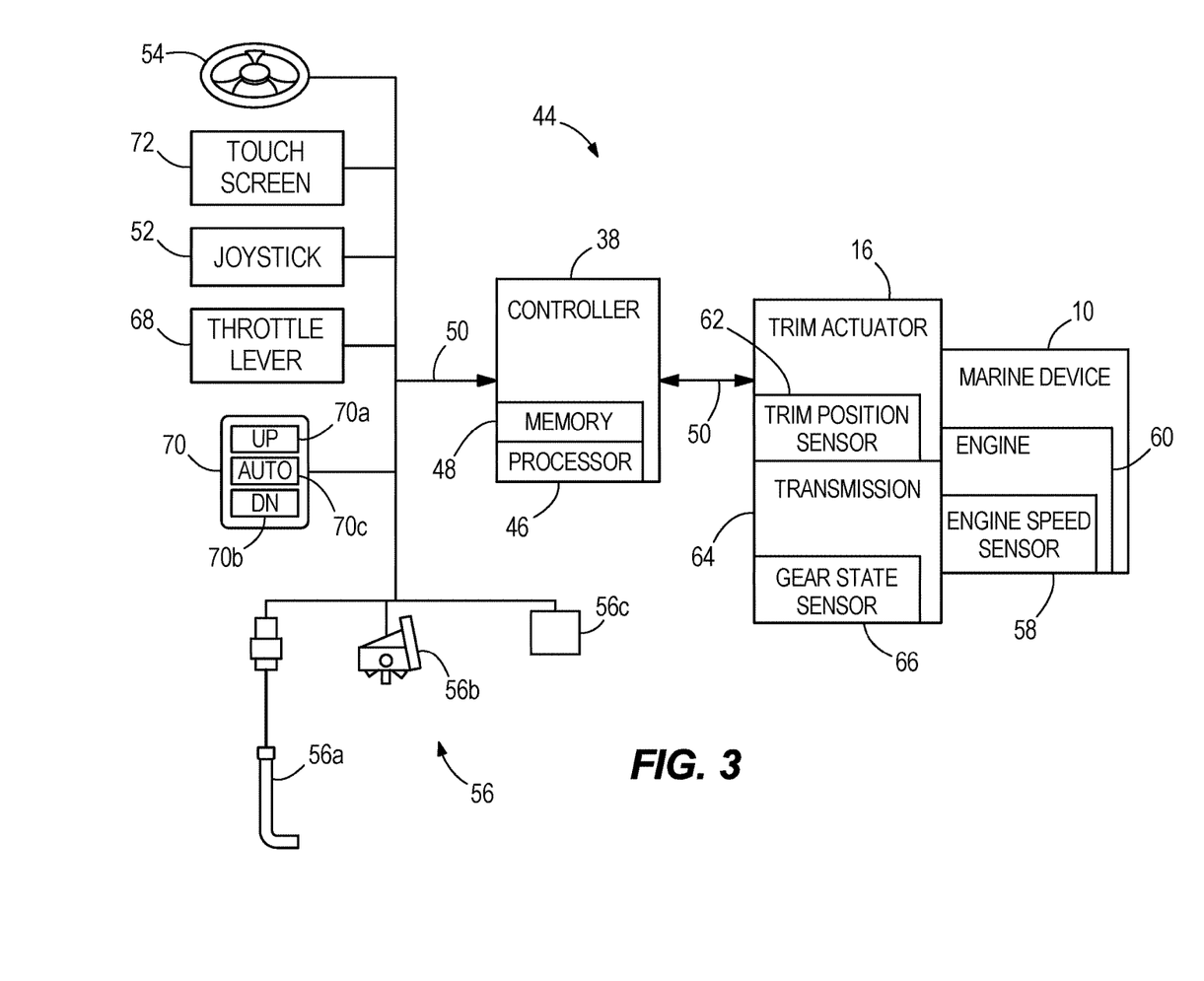
FIG. 3 illustrates an exemplary trim control system.

FIG. 3 shows a schematic of a system 44 associated with the marine vessel 14 of FIG. 1. In the example shown, the system 44 includes the control module 38, which is programmable and includes a processor 46 and a memory 48. The control module 38 can be located anywhere in the system 44 and/or located remote from the system 44 and can communicate with various components of the marine vessel 14 via wired and/or wireless links, as will be explained further herein below. Although FIG. 3 shows a single control module 38, the system 44 can include more than one control module 38. For example, the system 44 can have a control module 38 located at or near a helm of the marine vessel 14 and can also have one or more control modules located at or near the marine device 10. Portions of the method disclosed herein below can be carried out by a single control module or by several separate control modules. Each control module 38 can have one or more control sections or control units. One having ordinary skill in the art will recognize that the control module 38 can have many different forms and is not limited to the example that is shown and described. For example, here the control module 38 carries out the trim control method for the entire system 44, but in other examples separate trim control units and propulsion control units could be provided.

In some examples, the control module 38 may include a computing system that includes a processing system, storage system, software, and input/output (I/O) interfaces for communicating with devices such as those shown in FIG. 3, and about to be described herein. The processing system loads and executes software from the storage system, such as software programmed with a trim control method. When executed by the computing system, trim control software directs the processing system to operate as described herein below in further detail to execute the trim control method. The computing system may include one or many application modules and one or more processors, which may be communicatively connected. The processing system can comprise a microprocessor (e.g., processor 46) and other circuitry that retrieves and executes software from the storage system. Processing system can be implemented within a single processing device but can also be distributed across multiple processing devices or sub-systems that cooperate in existing program instructions. Non-limiting examples of the processing system include general purpose central processing units, applications specific processors, and logic devices.

The storage system (e.g., memory 48) can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a control module capable of communicating with the processing system. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

In this example, the control module 38 communicates with one or more components of the system 44 via a communication link 50, which can be a wired or wireless link. The control module 38 is capable of monitoring and controlling one or more operational characteristics of the system 44 and its various subsystems by sending and receiving control signals via the communication link 50. In one example, the communication link 50 is a controller area network (CAN) bus, but other types of links could be used. It should be noted that the extent of connections of the communication link 50 shown herein is for schematic purposes only, and the communication link 50 in fact provides communication between the control module 38 and each of the sensors, devices, etc. described herein, although not every connection is shown in the drawing for purposes of clarity.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple control modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

As mentioned, the control module 38 receives inputs from several different sensors and/or input devices aboard or coupled to the marine vessel 14. For example, the control module 38 receives a steering input from a joystick 52 and/or a steering wheel 54. The control module 38 is provided with an input from a vessel speed sensor 56. The vessel speed sensor 56 may be, for example, a pitot tube sensor 56*a*, a paddle wheel type sensor 56*b*, or any other speed sensor appropriate for sensing the actual speed of the marine vessel. The vessel speed may instead be obtained by taking readings from a GPS device 56*c*, which calculates speed by determining how far the marine vessel 14 has traveled in a given amount of time. The marine device 10 is provided with an engine speed sensor 58, such as but not limited to a tachometer, which determines a speed of the engine 60 powering the marine device 10 in rotations per minute (RPM). The engine speed can be used along with other measured or known values to approximate a vessel speed (i.e., to calculate a pseudo vessel speed). A trim position sensor 62 is also provided for sensing an actual position of the trim actuator 16, for example, by measuring a relative position between two parts associated with the trim actuator 16. The trim position sensor 62 may be any type of sensor known to those having ordinary skill in the art, for example a Hall Effect sensor or a potentiometer. A transmission 64 and gear state sensor 66 can also be provided for the marine device 10. FIG. 3 shows an instance in which the marine device 10 is an outboard motor, but in the instance that the marine device 10 is, for example, a stern drive or a trim tab, the transmission, engine, and their associated components would not be coupled to the trim actuator 16 as shown herein.

Other inputs to the system 44 can come from operator input devices such as a throttle lever 68, a keypad 70, and a touchscreen 72. The throttle lever 68 allows the operator of the marine vessel to choose to operate the vessel in neutral, forward, or reverse, as is known. The keypad 70 can be used to initiate or exit any number of control or operation modes (such as auto-trim mode), or to make selections while operating within one of the selected modes. In one example, the keypad 70 comprises an interface having a "trim up" button 70*a*, a "trim down" button 70*b*, and an "auto-trim on/resume" button 70*c*. The touchscreen 72 can also be used to initiate or exit any number of control or operation modes (such as trim up, trim down, or auto-trim mode), and in that case the inputs can be buttons in the traditional sense or selectable screen icons. The touchscreen 72 can also display information about the system 44 to the operator of the vessel, such as engine speed, vessel speed, trim angle, trim operating mode, vessel acceleration rate, etc.

One issue with many auto-trim systems is that trim actuators 16 are often controlled according to discrete steps and are thus actuated to be either on or off. Generally, when a relay (such as trim-in relay 34 or trim-out relay 36, FIG. 2) is energized for a specific amount of time in order to activate the trim actuator 16, the system will either overshoot or undershoot the target trim position by a small amount due to inertia of the trim pump-motor 32, time required for pump check valves (see 41, 43, FIG. 2) to fully close, expansion of the hydraulic lines 40, 42, length of the hydraulic lines 40, 42, etc. This makes it difficult to achieve an exact target trim position. These factors also make it difficult to calibrate a trim system for a given type of marine device 10. Trim speed (rate of change) varies greatly between marine devices due to factors such as trim system hardware differences, vessel type, and vessel speed. As will be described with respect to FIG. 4, algorithms have been developed that allow the control module 38 to broadly distinguish between types of propulsion devices, such as between an outboard motor and a stern drive, and between a 2-stroke and a 4-stroke engine, and then retrieve a unique auto-trim profile for such application. However, the present inventors are unaware of any algorithm that allows for adjustment of a trim system's calibration to account for specific variations on a propulsion-unit-to-propulsion-unit level.

Figure 4:
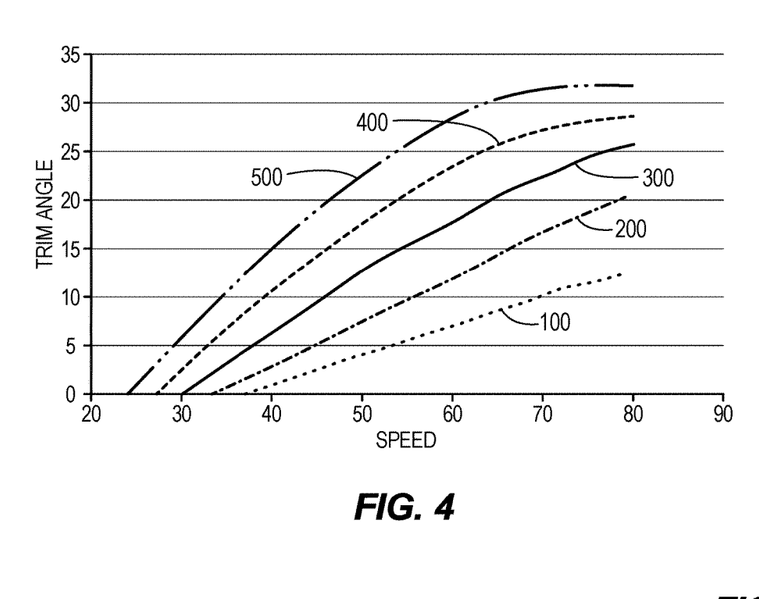
FIG. 4 illustrates a plurality of speed-based trim profiles that can be selected for determining a target trim position of a trimmable marine device.

FIG. 4 shows exemplary trim profiles 100, 200, 300, 400, 500, each profile defining a unique relationship between a plurality of vessel speeds and respective trim angles of the marine device 10 with respect to the marine vessel 14. For example, the plurality of vessel speeds are shown on the X-axis in kilometers per hour and the associated trim positions are shown as percentages of total allowed trim along the Y-axis. In other examples, the vessel speeds could be in miles per hour and the trim values could be angles. In yet another example, the X-axis could represent engine speed in RPM. The profiles shown in FIG. 4 were developed by determining optimal trim angles for a particular propulsion device powering a particular marine vessel at a number of tested vessel speeds. For example, vessels as varied as bass boats, walleye boats, pontoons, and racing boats were tested with a variety of different engines appropriate for those types of boats, under different loading conditions, in rough and calm water, and with different propellers. The optimal on-plane trim angles for each vessel/engine/condition combination were plotted with respect to the vessel speeds. The various data points on this plot were used to find best-fit lines that defined unique profiles for different types of engine/boat combinations. Although the trim profiles are shown herein as being graphical, optimal trim-position versus vessel (or engine) speed relationships for different vessel/engine combinations could also be stored in lookup tables, charts, or similar input-output maps. After the control module 38 reads the type of propulsion device over the communication link 50, it selects the appropriate trim profile for that propulsion device for use by the auto-trim algorithm, which provides some level of specificity to the calibrated trim-position versus speed relationship.

Figure 6:
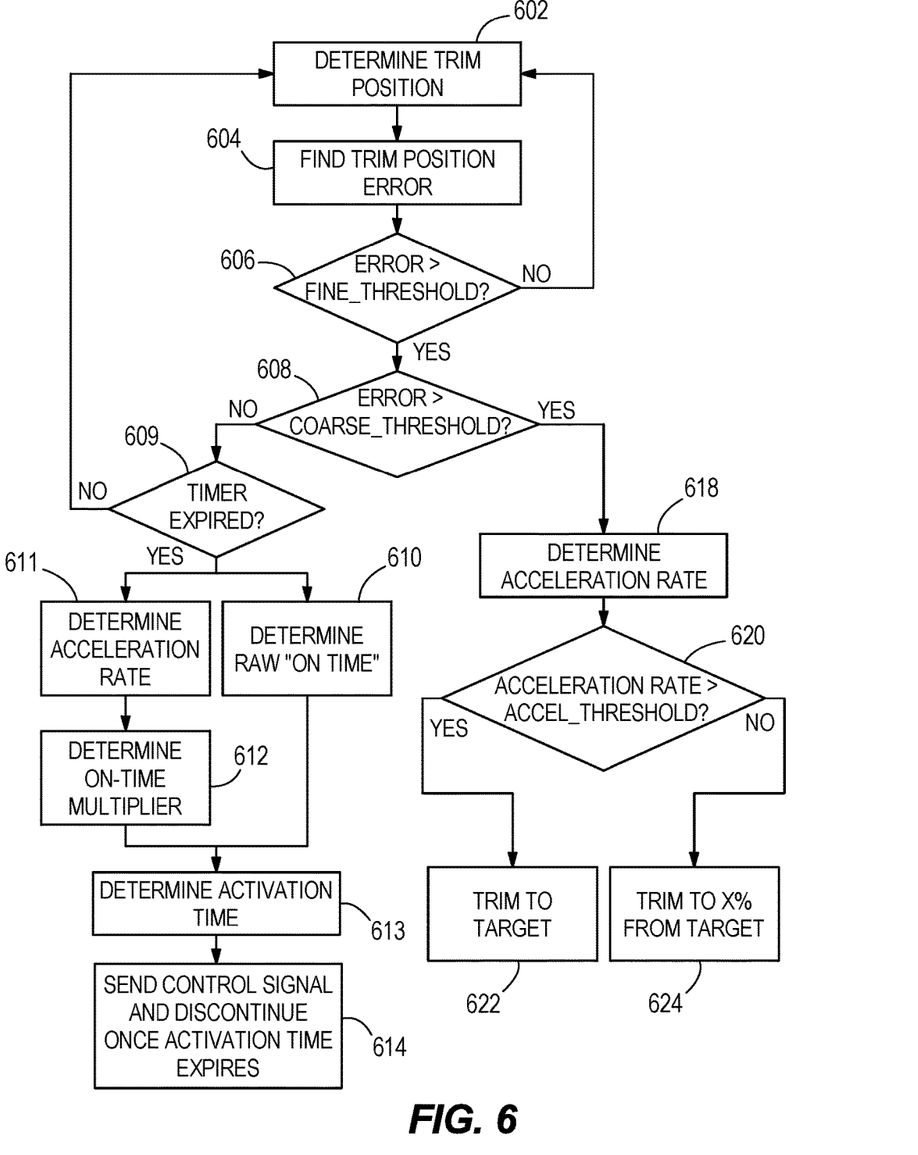
FIG. 6 shows a method for correcting trim position errors.

Algorithms have also been developed to reduce error that is due to the above-described overshot or undershoot phenomena, as shown in FIG. 6. As shown at 602, the method begins by determining a trim position of the marine device 10, such as with trim position sensor 62. The control module 38 then determines a magnitude of the trim position error by comparing the actual trim position to a target trim position, as shown at 604 (e.g., by subtracting one from the other). The method next includes determining if the error exceeds a first error threshold, herein referred to as a "fine threshold," as shown at 606. If YES, the method may also include comparing the trim position error to a second error threshold ("coarse threshold") having a greater magnitude than the first error threshold, as shown at 608. Depending on the determinations made in boxes 602 to 608, the method may next continue to box 609 or box 618. Alternatively, the method may skip both boxes 606 and 608 and may proceed directly from box 604 to box 609 or box 618. In the event that step 606 is present, if the determination at box 606 is NO, then the method returns to box 602, and will cycle until a trim position error greater than the first error threshold accumulates.

The method of boxes 609 to 614 is used to correct what have been referred to as "fine" errors and utilizes open loop control over the trim system. As shown in box 609, the method includes determining whether a given period of time has elapsed since the trim actuator 16 was last activated. If the timer step is included and the timer has not expired (NO at box 609), the method returns to box 602 and re-determines the trim position. In another example, the method might include first waiting for the timer to expire, and after that, determining if the trim position error is one that requires correction (see box 606). If the timer has expired, as shown at box 610, the method includes calculating a raw on-time based on the magnitude of the trim position error. As shown in box 611, the method also includes determining a magnitude of an acceleration rate of the marine vessel 14. This may be done by the control module 38 calculating a change in the velocity of the marine vessel 14 over time, or may be calculated by a program contained within the GPS device 56c and subsequently provided to the control module 38. In yet another example, the acceleration rate can be measured directly from an attitude heading reference sensor (AHRS), which measures via an accelerometer rather than by calculating change in speed over change in time. At box 612, the method includes determining an on-time multiplier based on the magnitude of the acceleration rate, as will also be described more fully herein below. Note that steps 610, 611, and 612 can be performed somewhat simultaneously, as shown, or can be preformed in succession in various orders.

Then, at box 613, the control module 38 multiplies the raw on-time by the on-time multiplier to determine the activation time of the trim actuator 16. Thus, the control module 38 determines the activation time of the trim actuator 16 based on the magnitude of the trim position error (factored in at box 610) and the magnitude of the acceleration rate (factored in at box 612). As shown at box 614, the method then includes sending a control signal with the control module 38 to activate the trim actuator 16 to rotate the marine device 10 toward the target trim position and then discontinuing the control signal once the activation time expires to deactivate the trim actuator 16. In one example, sending the control signal to activate the trim actuator 16 comprises providing electricity through a trim relay (trim-in relay 34 or trim-out relay 36) for the activation time. The control signal is discontinued once the activation time expires by discontinuing the flow of electricity through the relay's coil.

Any type of input-output map that relates a plurality of trim position errors to a plurality of calibrated on-times (e.g., look-up tables) may be used to determine the raw on-time for the trim actuator, as shown at box 610. For example, each error input returns a calibrated raw on-time that the trim-in relay 34 or the trim-out relay 36 needs to be activated in order to correct the error and achieve the target trim position. Generally, the raw on-time increases as the magnitude of the trim position error increases. The calibrated on-times will vary from system to system. For example, the raw on-time values stored in the input-output maps can be calibrated by testing individual trim systems and seeing how long a trim-in relay 34 or trim-out relay 36 must be provided with electricity in order to achieve a particular target trim position. The calibrated values will likely vary for outboards versus stern drives, and likely will vary based on whether the marine device 10 is being trimmed up or down. Generally, each calibrated on-time also depends on one or more of a time it takes a valve 41, 43 between the pump-motor combination 20 and the piston-cylinder assembly 18 to close, an amount of expansion of the first and second hydraulic lines 40, 42, and inertia of the pump-motor combination 20, as each of these things results in a delay between when the relay 34 or 36 is de-activated and movement of the trim actuator 16 ceases.

Other input-output maps accept an acceleration rate determined at box 611 as an input, and output a calibrated multiplier at box 612, which is used to scale the raw on-time calculated at box 610. The multiplier may be used to account for engine loading and predicted movement of the target trim position. For example, if the marine vessel 14 is accelerating and the target trim position is increasing, a longer on-time for the trim-out relay 36 is required to account for the increasing target trim position as well as to account for an opposing load created by the thrust of the propulsion device against the direction of the trim event. If the acceleration is relatively low, the calibrated raw on-time value provides enough activation time to move the marine device 10 to the target position. However, if the marine vessel 14 is accelerating at a high rate, a multiplier may be needed to increase the activation time to account for the extra load created by the thrust of the propulsion device. On the other hand, if the marine vessel 14 is decelerating, the target trim position is decreasing and a hydrodynamic load is pushing up on the propulsion device due to the marine vessel 14 coasting down, which requires a longer on-time for the trim-in relay 34 to account for the decreasing trim target position and the opposing hydrodynamic load on the drive unit. If the deceleration rate is relatively low, then the calibrated raw on-time provides enough activation time to move the marine device 10 to the target position. However, if the marine vessel 14 is decelerating at a high rate, a multiplier may be needed to increase the activation time to account for the extra hydrodynamic load on the propulsion device as the vessel quickly slows. The multiplier is then used as such at box 613: ACTIVATION_TIME=RAW_ON-TIME*MULTIPLIER.

In other examples, the acceleration rate is not used to find a multiplier, but to find a number that is added to or subtracted from the raw on-time to find an activation time. In still other examples, both the multiplier and the raw on-time are combined into one large input-output map that accepts both trim position error and acceleration rate as inputs and outputs an activation time. Other types of equations or algorithms could be used instead of tables. Alternatively, enough calibrations may be done such that required on-times for each sign and magnitude of trim error at each sign and magnitude of acceleration rate are determined and used as activation times.

The method of boxes 618 to 624 is used to correct what have been referred to as "coarse" errors. As shown in box 618, the method includes determining an acceleration rate of the marine vessel 14. The control module 38 then compares the magnitude of the acceleration rate to an acceleration rate threshold, as shown in box 620. In response to determining that the magnitude of the acceleration rate exceeds the given rate threshold (YES at box 620), the method includes commanding the marine device 10 to the target trim position with the control module 38, as shown at box 622. On the other hand, in response to determining that the magnitude of the acceleration rate does not exceed the given rate threshold (NO at box 620), the method includes commanding the marine device 10 to a setpoint trim position that is different from the target trim position. In one example, this means the control module 38 commands the marine device 10 to a setpoint trim position that is a given range (e.g., X %) from the target trim position, as shown at box 624.

In one example, commanding the marine device 10 to the target trim position comprises commanding the trim actuator 16 to move the marine device 10 toward the target trim position until the control module 38 determines that the actual trim position as measured by the trim position sensor 62 is equal to the target trim position. Similarly, commanding the marine device 10 to the setpoint trim position comprises commanding the trim actuator 16 to move the marine device 10 toward the target trim position until the control module 38 determines that the actual trim position as measured by the trim position sensor 62 is within a given range of the target trim position. The given range may be a calibrated value that is intended to allow the trim actuator 16 and marine device 10 to coast from the setpoint trim position to the target trim position. In this manner, the method takes advantage of the overshoot present in a hydraulic trim system by de-energizing the relay 34 or 36 once the trim position sensor 62 senses that the actual trim position is equal to the setpoint trim position, which setpoint trim position is a calibrated amount away from the target trim position. As the trim actuator 16 continues to move even after the relay 34 or 36 is no longer energized, the marine device 10 coasts through the calibrated angular amount and reaches the target trim position.

The methods of the present disclosure described herein below with respect to FIGS. 7 and 8 use information determined while carrying out the above auto-trim methods, including the fine and coarse error correction algorithms of FIG. 6. The control module 38 uses such information to adapt to the rate of change (trim speed) of the particular trim system on the particular marine device 10 with which the control module 38 is associated. The present algorithms may be carried out in the background after an auto-trim system has been installed on the marine vessel 14. The control module 38 will use trim position error determined after a fine error correction and/or trim rate of change determined after a coarse error correction to make adjustments to the calibrated trim activation time (duty cycle ON-time), such as by modifying trim system gains for use during future trim events. Using such adjusted trim gains will result in repeatable achievement of the target trim position by counteracting the effects of factors such as hardware type and age, boat type and length, battery voltage and accessory load on the battery, propeller type and speed, boat speed, and driveshaft length, all of which tend to cause different trim systems to trim at different speeds and thus to achieve different angular rotation of the marine device 10 despite being activated for same activation time.

Figure 7:
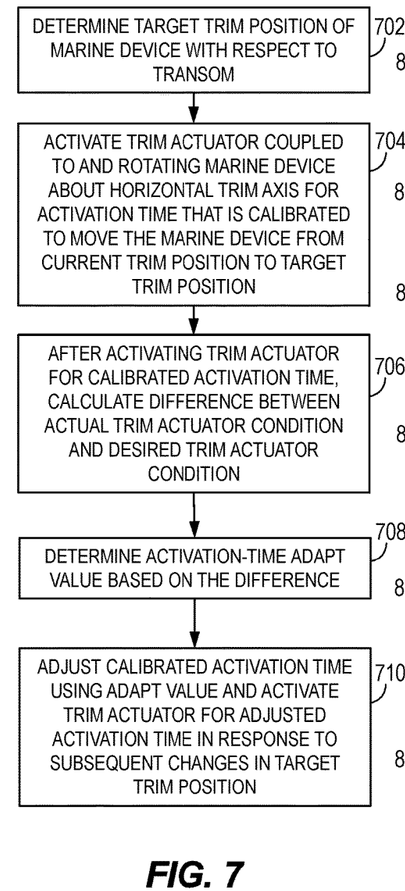
FIG. 7 illustrates a method according to the present disclosure for adjusting an activation time of the trim actuator.

One example of a method according to the present disclosure is shown in FIG. 7. The method is carried out by the control module 38 and includes, as shown at box 702, determining a target trim position of the marine device 10 with respect to the transom 12. As described above and with respect to FIG. 4, this may include utilizing the current vessel speed as determined from one of the speed sensors 56 to retrieve a stored target trim position paired therewith from a plurality of target trim positions stored in the memory 48, each stored target trim position in the plurality of stored target trim positions being paired with a respective vessel speed. As shown at box 704, the method includes activating a trim actuator 16 coupled to and rotating the marine device 10 about a horizontal trim axis 13 for an activation time that is calibrated to move the marine device 10 from a current trim position to the target trim position. For example, the control module 38 may output a pulse width modulated signal to energize one of the relays 34 or 36 for a predetermined ON-time that is calibrated to move the marine device 10 by a given amount. The ON-time may be determined according to calibrated input-output maps and equations described herein above with respect to boxes 610, 611, 612, and 613 of FIG. 6. After activating the trim actuator 16 for the calibrated activation time (for example, see box 614, FIG. 6), the method includes calculating a difference between an actual trim actuator condition and a desired trim actuator condition, as shown at box 706. The trim actuator condition may be a trim position as determined by the trim position sensor 62 or a trim rate of change as determined by a change in readings from the trim position sensor 62 over a period of time.

As shown at box 708, the control module 38 then determines an activation-time adapt value based on the difference calculated in box 706. As shown at box 710, the control module 38 later adjusts the calibrated activation time using the adapt value and activates the trim actuator 16 for the adjusted activation time in response to subsequent changes in the target trim position. In one example, after activating the trim actuator 16 for the calibrated activation time, the method includes calculating a position difference between an actual, measured trim position of the marine device 10 and the target trim position, and determining the adapt value based on the position difference. In another example, the method includes calculating an actual trim rate of change as the marine device 10 moves from the current trim position to the target trim position; calculating a rate difference between the actual trim rate of change and a calibrated trim rate of change; and determining the adapt value based on the rate difference. In both cases, the adapt value is configured such that activating the trim actuator 16 for the adjusted activation time moves the marine device 10 closer to the target trim position than does activating the trim actuator 16 for the calibrated activation time.

By way of more specific example, the adapt value can be calculated by dividing the difference determined at box 706 by the actual trim actuator condition, whether the difference and actual trim actuator condition be trim position-related or trim rate-related. If the adapt value is determined using position measurements, the adapt value can be determined by the following Equation 1.1:

$$ADAPT_{position} = (POSITION_{target} - POSITION_{measured})/POSITION_{measured} \quad \text{Eq. 1.1}$$

If the adapt value is determined using rate measurements, the adapt value can be determined by the Equation 1.2:

$$ADAPT_{rate} = (RATE_{cal} - RATE_{measured})/RATE_{measured} \quad \text{Eq. 1.2}$$

The method may then include calculating the adjusted activation time by multiplying the calibrated activation time by (1+the adapt value). In other words, the adjusted activation time is determined according to Equation 2.1 or 2.2:

$$TIME_{adjust} = TIME_{cal} * (1 + ADAPT_{position}) \quad \text{Eq. 2.1}$$

$$TIME_{adjust} = TIME_{cal} * (1 + ADAPT_{rate}) \quad \text{Eq. 2.2}$$

Note that although the adapt values have been and will be described as multipliers, they could alternatively be adders.

The control module 38 may be programmed to utilize the adapt value to adjust the activation time during the very next iteration of control, upon change in the vessel or engine speed and resulting subsequent change in the target trim position. In other words, the very next time that the method of FIG. 6 is carried out, the activation time determined in box 613 will be adjusted by the adapt value before a control signal is set to the trim actuator 16. In another example, the method includes calculating the adjusted activation time by multiplying the calibrated activation time by the adapt value to determine an additional activation time, and iteratively adding a portion of the additional activation time to the calibrated activation time in response to each subsequent change in the target trim position. This is shown by Equations 3.1 and 3.2:

$$TIME_{adjust} = TIME_{cal} + n(TIME_{cal} * ADAPT_{position}) \quad \text{Eq. 3.1}$$

$$TIME_{adjust} = TIME_{cal} + n(TIME_{cal} * ADAPT_{rate}) \quad \text{Eq. 3.2}$$

where "n" is a number between zero and one that increases by a given amount during each iteration of control until n=1. This latter method provides a gradual way of implementing the adjusted activation time, wherein during each iteration of trim control, the adjusted activation time gradually approaches the fully adapted value. Note that the above Equations 3.1 and 3.2 are merely examples of how the adaptation could be implemented over time, and other equations will achieve the same outcome.

The adapt value is stored in the memory 48 for use during future trim events. The same adapt value can be used for all trim events, wherein a calibrated activation time associated with any desired movement of the trim actuator 16 is multiplied by (1+the adapt value) throughout a full range of vessel speeds. Alternatively, the method may include storing a plurality of adapt values in the memory 48 of the control module 38, and pairing each stored adapt value in the plurality of stored adapt values with a respective speed at which the marine vessel 14 was traveling when the target trim position was determined. For example, if the marine vessel 14 is traveling at X mph, the control module 38 would first determine the target trim position paired with X mph. The control module 38 would send a trim signal to the trim actuator 16 to trim the marine device 10 for the calibrated activation time required to move the marine device 10 from its current trim position to the target trim position (i.e., to correct the error). The control module 38 would then use the resulting trim position or the rate of change in trim position to determine the adapt value. This adapt value would then be stored in the memory 48 as being associated with X mph. When the marine vessel 14 travels at other speeds, the adapt values calculated at those other speeds would be saved to populate a table of adapt values (or gains) versus vessel speed. Thereafter, in response to each subsequent change in the target trim position, the control module 38 would utilize a current speed of the marine vessel 14 to retrieve the stored adapt value paired therewith and would utilize the stored adapt value to calculate the adjusted activation time. Note that one or more of the adapt values stored in the memory 48 may be stored-over in the event that it no longer serves to reduce the position difference between the actual and target trim positions during future iterations of trim control. For instance, the trim system hardware may wear over time, and the adapt values may need to be updated to account for faster or slower trim rate of change due to the aging hardware. Additionally, adapt values may be stored-over as they are implemented gradually via iteration, as described herein above.

Figure 5:
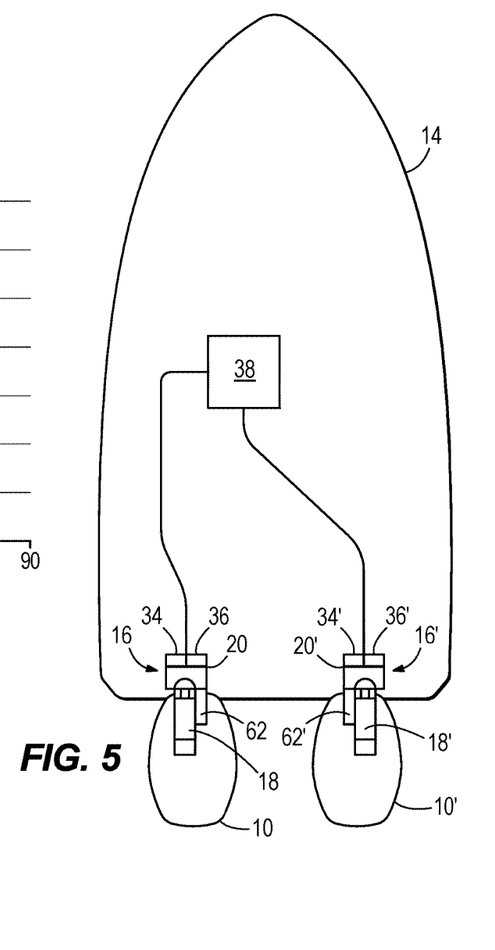
FIG. 5 illustrates a schematic of a marine vessel with two marine devices.

In another example, as shown in FIG. 5, there are multiple marine devices 10, 10' coupled to the transom 12 of the marine vessel 14. The system shown in FIG. 5 is similar to that of FIG. 1 in that the control module 38 determines target trim positions of the marine devices 10, 10' based on a condition of the marine vessel 14 (such as vessel speed and/or engine speed), and there are trim position sensors 62, 62' that sense actual trim positions of the marine devices 10, 10' and send actual trim position information to the control module 38. Trim actuators 16, 16' (each including relays 34, 36, 34', 36') are coupled to the marine devices 10, 10' and configured to rotate the marine devices 10, 10' about horizontal trim axes in response to signals from the control module 38. (Note that although only two marine devices are shown in FIG. 5, the method described herein is applicable to more than two.)

The method according to the present disclosure may include determining a target trim position for the marine devices 10, 10' with respect to the transom 12. The method may then include activating multiple trim actuators 16, 16' coupled to and rotating the respective marine devices 10, 10' about respective horizontal trim axes for an activation time that is calibrated to move the marine devices 10, 10' from respective current trim positions to the target trim position. After activating the trim actuators 16, 16' for the calibrated activation time, the method may include calculating respective differences between actual trim actuator conditions and desired trim actuator conditions. The method may include determining respective activation-time adapt values on an individual marine device basis based on the respective differences, which allows the individual adapt values to correct for differences between the trim actuators 16, 16' and marine devices 10, 10' that cause the marine devices 10, 10' to be trimmed to different trim positions despite being activated initially for the same calibrated amount of time. The method then includes adjusting the calibrated activation time using the respective adapt values and activating the trim actuators 16, 16' for the respective adjusted activation times in response to subsequent changes in the target trim position. The respective adapt values are configured such that activating the trim actuators 16, 16' for the respective adjusted activation times moves the marine devices 10, 10' closer to the target trim position than does activating the trim actuators 16, 16' for the calibrated activation time. Note that although the marine devices 10, 10' are described as having the same target trim position in this example, they need not have the same target trim position, such as if three or four marine devices are provided on the transom 12, and the two outer marine devices have a different target trim position than do(es) the two (or one) inner propulsion device(s).

Figure 8:
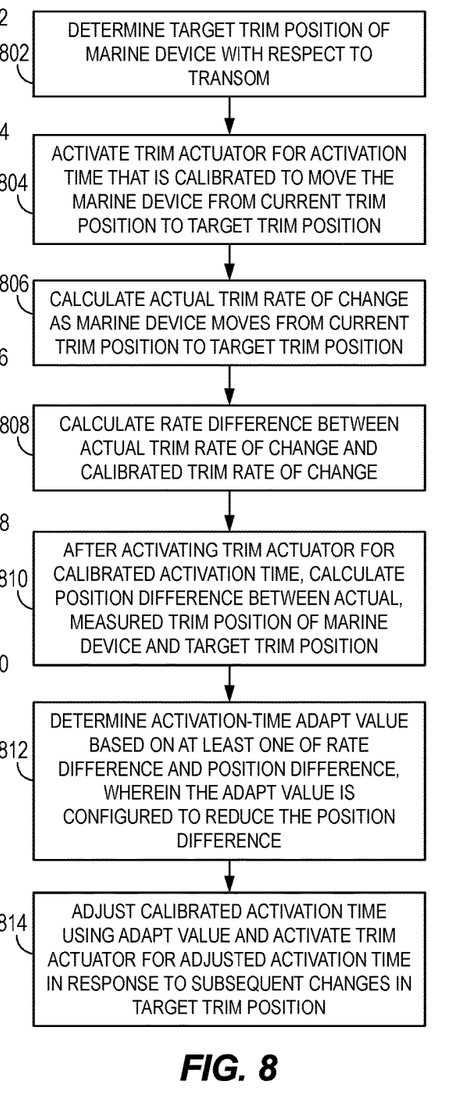
FIG. 8 illustrates another method according to the present disclosure for adjusting an activation time of the trim actuator.

FIG. 8 shows another method for controlling a trim position of a trimmable marine device 10 coupled to a transom 12 of a marine vessel 14. The method is carried out by the control module 38 and includes determining a target trim position of the marine device 10 with respect to the transom 12, as shown at box 802. Again, this is performed as described herein above with respect to FIG. 4, and includes utilizing the current vessel speed to retrieve a stored target trim position paired therewith from a plurality of target trim positions stored in the memory 48, each stored target trim position in the plurality of stored target trim positions being paired with a respective vessel speed. As also described herein above with respect to FIG. 4, when the marine device 10 is a propulsion device, the method may first include receiving a type of the propulsion device via a communication link 50 and retrieving an input-output map containing the plurality of stored target trim positions paired with the respective vessel speeds, which map is unique to the type of the propulsion device. As shown at box 804, the method next includes activating a trim actuator 16 coupled to and rotating the marine device 10 about a horizontal trim axis 13 for an activation time that is calibrated to move the marine device 10 from a current trim position to the target trim position. This is done according to the error-correcting method described herein above with respect to FIG. 6.

As shown at box 806, the method includes calculating an actual trim rate of change as the marine device 10 moves from the current trim position to the target trim position. For instance, the control module 38 can use a timer or clock to determine the length of time it takes for the marine device 10 to move from the current trim position to a subsequent, actual trim position that is at or near the target trim position. The control module 38 can calculate the difference between the subsequent, actual trim position (the ending trim position) and the previously current trim position (the starting trim position) and can divide this by the time it took for such position change to be carried out. In other examples, the control module 38 could time how long it takes for the trim actuator 16 to move the marine device 10 by a predetermined amount, such as a given percentage of full trim, or could calculate a position change that occurred during a predetermined amount of time, such as a given number of seconds. As shown at box 808, the method also includes calculating a rate difference between the actual trim rate of change calculated at box 806 and a calibrated trim rate of change. The calibrated trim rate of change is a value that is stored in the memory 48 of the control module 38.

After activating the trim actuator 16 for the calibrated activation time in box 804, as discussed in more detail herein above with respect to FIG. 6, the method includes calculating a position difference between an actual, measured trim position of the marine device 10 and the target trim position, as shown at box 810. The control module 38 will subtract the value provided from the trim position sensor 62 from the value determined at box 802.

As shown at box 812, the method then includes determining an activation-time adapt value based on at least one of the rate difference determined at box 808 and the position difference determined at box 810. According to the present disclosure, the adapt value is configured to reduce the position difference between the actual, measured trim position and the target trim position upon subsequent activation of the trim actuator 16 in response to subsequent changes in the target trim position. The control module 38 determines the adapt value by dividing the at least one of the rate difference and the position difference by one of the actual trim rate of change and the actual, measured trim position, respectively, according to the corresponding Equation 1.1 or 1.2 provided above. As shown at box 814, the control module 38 adjusts the calibrated activation time using the adapt value and activates the trim actuator 16 for the adjusted activation time in response to subsequent changes in the target trim position. The control module 38 calculates the adjusted activation time by multiplying the calibrated activation time by (1+the adapt value), according to Equation 2.1 or 2.2. Alternatively, the control module 38 may calculate the adjusted activation time by multiplying the calibrated activation time by the adapt value to determine an additional activation time, and iteratively adding a portion of the additional activation time to the calibrated activation time in response to each subsequent change in the target trim position, according to Equation 3.1 or 3.2.

In one example, the control module 38 will use the lesser of the two adapt values (position-based or rate-based) to calculate the adjusted activation time, in order to avoid over-adapting. If the lesser of the two adapt values still results in a position error during the next iteration of trim control, then the control module 38 may add a fraction of the selected lesser of the two adapt values to the selected adapt value during each iteration of control, until the greater of the two adapt values is reached and ultimately used to calculate the adjusted activation time. Alternatively, if the lesser of the two adapt values still results in a position error during the next iteration of trim control, the control module 38 may switch to using the greater of the two adapt values during a subsequent iteration of trim control. In yet another example, the control module 38 determines the adapt value based on both the rate difference and the position difference by dividing the rate difference by the actual trim rate of change to determine a rate-based adapt value; dividing the position difference by the actual, measured trim position to determine a position-based adapt value; and averaging the rate-based adapt value and the position-based adapt value. The first two steps are shown in Equations 1.2 and 1.2 above. The final step is shown in Equation 4.1 below:

$$ADAPT_{average} = (ADAPT_{position} + ADAPT_{rate})/2 \qquad \text{Eq. 4.1}$$

Note that the control module 38 could weight the position-based adapt value or the rate-based adapt value differently based on various conditions. For example, if the trim command pulse width did not exceed a given time threshold, the control module 38 might weight the position-based adapt value more than the rate-based adapt value. This is because a rate calculated over a short period of time is likely less accurate than a rate calculated over a longer period of time.

When selecting between using the rate-based adapt value and the position-based adapt value, the control module 38 may also use the principle noted above. That is, if the pulse width of the trim command did not exceed a given threshold time, the control module 38 may select to calculate and use the position-based adapt value, given that it is difficult to calculate an accurate rate over a short period of time. If the pulse width of the trim command did exceed the given threshold time, the control module 38 may select to calculate and use the rate-based adapt value. In another example, the control module 38 uses the determination at box 608 in FIG. 6 to decide whether to calculate and use the position-based or rate-based adapt value. If the answer at box 608 is NO and the trim position error is less than the coarse threshold, the control module 38 will calculate the position-based adapt value, seeing as the activation time is likely to be short and any rate calculated during that time may not be accurate. On the other hand, if the answer at box 608 is YES and the trim position error is greater than the coarse threshold, the control module 38 will calculate the rate-based adapt value, seeing as the activation time is likely to be longer and a rate of change calculated during that time should be accurate.

As with the method of FIG. 7, the method of FIG. 8 may also include storing a plurality of adapt values in the memory 48 of the control module 38, and pairing each stored adapt value in the plurality of stored adapt values with a respective speed at which the marine vessel 14 was traveling when the target trim position was determined. In response to each subsequent change in the target trim position, the method further comprises utilizing a current speed of the marine vessel 14 to retrieve the stored adapt value paired therewith, and utilizing the stored adapt value to calculate the adjusted activation time.

Additionally, as described with respect to FIG. 5, when the marine vessel 14 includes multiple trimmable marine devices 10, 10' coupled to the transom 12, the method of FIG. 8 may further include determining a target trim position for the marine devices 10, 10' with respect to the transom 12; activating multiple trim actuators 16, 16' coupled to and rotating respective marine devices 10, 10' about respective horizontal trim axes for an activation time that is calibrated to move the marine devices 10, 10' from respective current trim positions to the target trim position; calculating respective actual trim rates of change as the marine devices 10, 10' move from the respective current trim positions to the target trim position; and calculating respective rate differences between the respective actual trim rates of change and a calibrated trim rate of change. After activating the trim actuators 16, 16' for the calibrated activation time, the method includes calculating respective position differences between respective actual, measured trim positions of the marine devices 10, 10' and the target trim position; determining respective activation-time adapt values on an individual marine device basis based on at least one of the respective rate differences and the respective position differences, wherein the adapt values are configured to reduce the respective position differences; and adjusting the calibrated activation time using the respective adapt values and activating the trim actuators 16, 16' for the respective adjusted activation times in response to subsequent changes in the target trim position.

The methods described herein above supplement the control module's ability to select between different trim profiles depending on the type of propulsion device, seeing as a given trim system on a given propulsion device may operate at various speeds depending on a number of different factors. For example, the vessel type and length, the battery voltage and accessory load (i.e., how many other accessories are turned on and connected to the same battery), the type and speed of the propeller, and the vessel speed all have effects on how quickly a trim actuator will be able to trim a propulsion device. Additionally, with the relatively recent prevalence of using two, three, or four propulsion devices on a given vessel's transom, drive shaft length also affects trim speed, especially on a vessel with a V-shaped hull, where the inner and outer propulsion devices have different shaft lengths in order to sit in the water at the same depth, and knowing that a propulsion device with a shorter shaft length will trim faster than one with a longer shaft length. Having a real-time adaptation algorithm that adjusts the activation time of the trim actuator on a per-device basis can help compensate for trim-speed differences. Accounting for such differences will enable the marine devices to be trimmed to the same positions as one another, providing a level, equal trim across all devices, and thereby improving performance and meeting boaters' perception expectations.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A method for controlling a trim position of a trimmable marine device coupled to a transom of a marine vessel, the method being carried out by a control module and comprising:

determining a target trim position of the marine device with respect to the transom;

activating a trim actuator coupled to and rotating the marine device about a horizontal trim axis for an activation time that is calibrated to move the marine device from a current trim position to the target trim position;

after activating the trim actuator for the calibrated activation time, calculating a difference between an actual trim actuator condition and a desired trim actuator condition;

determining an activation-time adapt value based on the difference; and adjusting the calibrated activation time using the adapt value and activating the trim actuator for the adjusted activation time in response to subsequent changes in the target trim position;

wherein the adapt value is configured such that activating the trim actuator for the adjusted activation time moves the marine device closer to the target trim position than does activating the trim actuator for the calibrated activation time.

2. The method of claim 1, further comprising storing a plurality of adapt values in a memory of the control module, and pairing each stored adapt value in the plurality of stored adapt values with a respective speed at which the marine vessel was traveling when the target trim position was determined.

3. The method of claim 2, wherein in response to each subsequent change in the target trim position, the method further comprises utilizing a current speed of the marine vessel to retrieve the stored adapt value paired therewith, and utilizing the stored adapt value to calculate the adjusted activation time.

4. The method of claim 3, further comprising utilizing the current vessel speed to retrieve a stored target trim position paired therewith from a plurality of target trim positions stored in the memory, each stored target trim position in the plurality of stored target trim positions being paired with a respective vessel speed.

5. The method of claim 1, further comprising determining the adapt value by dividing the difference by the actual trim actuator condition.

6. The method of claim 5, further comprising calculating the adjusted activation time by multiplying the calibrated activation time by (1+the adapt value).

7. The method of claim 5, further comprising calculating the adjusted activation time by multiplying the calibrated activation time by the adapt value to determine an additional activation time, and iteratively adding a portion of the additional activation time to the calibrated activation time in response to each subsequent change in the target trim position.

8. The method of claim 1, wherein the marine vessel includes multiple trimmable marine devices coupled to the transom, and the method further includes:

determining a target trim position of the marine devices with respect to the transom;

activating multiple trim actuators coupled to and rotating respective marine devices about respective horizontal trim axes for an activation time that is calibrated to move the marine devices from respective current trim positions to the target trim position;

after activating the trim actuators for the calibrated activation time, calculating respective differences between actual trim actuator conditions and desired trim actuator conditions;

determining respective activation-time adapt values on an individual marine device basis based on the respective differences; and adjusting the calibrated activation time using the respective adapt values and activating the trim actuators for the respective adjusted activation times in response to subsequent changes in the target trim position;

wherein the respective adapt values are configured such that activating the trim actuators for the respective adjusted activation times moves the marine devices closer to the target trim position than does activating the trim actuators for the calibrated activation time.

9. The method of claim 1, further comprising:

after activating the trim actuator for the calibrated activation time, calculating a position difference between an actual, measured trim position of the marine device and the target trim position; and determining the adapt value based on the position difference.

10. The method of claim 1, further comprising:

calculating an actual trim rate of change as the marine device moves from the current trim position to the target trim position;

calculating a rate difference between the actual trim rate of change and a calibrated trim rate of change; and determining the adapt value based on the rate difference.

11. A method for controlling a trim position of a trimmable marine device coupled to a transom of a marine vessel, the method being carried out by a control module and comprising:

determining a target trim position of the marine device with respect to the transom;

activating a trim actuator coupled to and rotating the marine device about a horizontal trim axis for an activation time that is calibrated to move the marine device from a current trim position to the target trim position;

calculating an actual trim rate of change as the marine device moves from the current trim position to the target trim position;

calculating a rate difference between the actual trim rate of change and a calibrated trim rate of change;

after activating the trim actuator for the calibrated activation time, calculating a position difference between an actual, measured trim position of the marine device and the target trim position;

determining an activation-time adapt value based on at least one of the rate difference and the position difference, wherein the adapt value is configured to reduce the position difference; and adjusting the calibrated activation time using the adapt value and activating the trim actuator for the adjusted activation time in response to subsequent changes in the target trim position.

12. The method of claim 11, further comprising storing a plurality of adapt values in a memory of the control module, and pairing each stored adapt value in the plurality of stored adapt values with a respective speed at which the marine vessel was traveling when the target trim position was determined.

13. The method of claim 12, wherein in response to each subsequent change in the target trim position, the method further comprises utilizing a current speed of the marine vessel to retrieve the stored adapt value paired therewith, and utilizing the stored adapt value to calculate the adjusted activation time.

14. The method of claim 13, further comprising utilizing the current vessel speed to retrieve a stored target trim position paired therewith from a plurality of target trim positions stored in the memory, each stored target trim position in the plurality of stored target trim positions being paired with a respective vessel speed.

15. The method of claim 14, wherein the marine device is a propulsion device, and further comprising:

receiving a type of the propulsion device via a communication link; and retrieving an input-output map containing the plurality of stored target trim positions paired with the respective vessel speeds, which map is unique to the type of the propulsion device.

16. The method of claim 11, further comprising determining the adapt value by dividing the at least one of the rate difference and the position difference by one of the actual trim rate of change and the actual, measured trim position, respectively.

17. The method of claim 16, further comprising calculating the adjusted activation time by multiplying the calibrated activation time by (1+the adapt value).

18. The method of claim 16, further comprising calculating the adjusted activation time by multiplying the calibrated activation time by the adapt value to determine an additional activation time, and iteratively adding a portion of the additional activation time to the calibrated activation time in response to each subsequent change in the target trim position.

19. The method of claim 11, further comprising determining the adapt value based on both the rate difference and the position difference by:
dividing the rate difference by the actual trim rate of change to determine a rate-based adapt value;
dividing the position difference by the actual, measured trim position to determine a position-based adapt value; and
averaging the rate-based adapt value and the position-based adapt value.

20. The method of claim 11, wherein the marine vessel includes multiple trimmable marine devices coupled to the transom, and the method further includes:
determining a target trim position of the marine devices with respect to the transom;
activating multiple trim actuators coupled to and rotating respective marine devices about respective horizontal trim axes for an activation time that is calibrated to move the marine devices from respective current trim positions to the target trim position;
calculating respective actual trim rates of change as the marine devices move from the respective current trim positions to the target trim position;
calculating respective rate differences between the respective actual trim rates of change and a calibrated trim rate of change;
after activating the trim actuators for the calibrated activation time, calculating respective position differences between respective actual, measured trim positions of the marine devices and the target trim position;
determining respective activation-time adapt values on an individual marine device basis based on at least one of the respective rate differences and the respective position differences, wherein the adapt values are configured to reduce the respective position differences; and
adjusting the calibrated activation time using the respective adapt values and activating the trim actuators for the respective adjusted activation times in response to subsequent changes in the target trim position.

* * * * *